US011524713B2

(12) United States Patent
Geiger et al.

(10) Patent No.: US 11,524,713 B2
(45) Date of Patent: Dec. 13, 2022

(54) STEERING COLUMN FOR A MOTOR VEHICLE

(71) Applicants: thyssenkrupp Presta AG, Eschen (LI); thyssenkrupp AG, Essen (DE)

(72) Inventors: Adrian Vincent Geiger, Balgach (CH); Manoel Machinek, Balgach (CH); Balint Kalman Nagy, Montlingen (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/417,156

(22) PCT Filed: Jan. 13, 2020

(86) PCT No.: PCT/EP2020/050634
§ 371 (c)(1),
(2) Date: Jun. 22, 2021

(87) PCT Pub. No.: WO2020/148198
PCT Pub. Date: Jul. 23, 2020

(65) Prior Publication Data
US 2022/0073126 A1    Mar. 10, 2022

(30) Foreign Application Priority Data

Jan. 16, 2019   (DE) ..................... 10 2019 200 488.1

(51) Int. Cl.
*B62D 1/184*   (2006.01)
*B62D 1/19*    (2006.01)
(52) U.S. Cl.
CPC ............. *B62D 1/184* (2013.01); *B62D 1/195* (2013.01)
(58) Field of Classification Search
CPC ................................ B62D 1/184; B62D 1/195
See application file for complete search history.

(56) References Cited

U.S. PATENT DOCUMENTS 8,006,587 B2 *   8/2011   Schnitzer ............... B62D 1/184
                                                           74/493
9,840,269 B2 *  12/2017   Tanaka .................. B62D 1/184
                          (Continued)

FOREIGN PATENT DOCUMENTS

CN         108367772 A     8/2018
DE    10 2005 035 009 B    12/2006
                  (Continued)

OTHER PUBLICATIONS

English Translation of International Search Report issued in PCT/EP2020/050634, dated Apr. 6, 2020.

*Primary Examiner* — Drew J Brown
(74) *Attorney, Agent, or Firm* — thyssenkrupp North America, LLC

(57) ABSTRACT

A steering column includes an adjusting unit that is fixedly clampable releasably to a supporting unit and in which a steering spindle is mounted rotatably about a longitudinal axis, a clamping device with a release position and a fixing position for locking the adjusting unit to the supporting unit, a clamping bolt arranged along a clamping axis and guided transversely with respect to the longitudinal axis through an elongated hole in the supporting unit extending in an adjustment direction and in which the clamping bolt in the release position is movable. A fixing element on the clamping bolt can be braced by the clamping device in the direction of the clamping axis against the supporting unit. A guide device may have guide elements on the fixing element and on the supporting unit that are spaced apart from the elongated hole, the fixing element being guided in the guide elements in a translational manner relative to the supporting unit.

20 Claims, 3 Drawing Sheets

(56) References Cited

U.S. PATENT DOCUMENTS

| | | | | |
|---|---|---|---|---|
| 9,840,270 | B2* | 12/2017 | Tomiyama | B62D 1/184 |
| 2005/0016315 | A1* | 1/2005 | Breuss | B62D 1/184 |
| | | | | 74/493 |
| 2008/0185829 | A1 | 8/2008 | Senn | |
| 2008/0224459 | A1* | 9/2008 | Oh | B62D 1/195 |
| | | | | 280/777 |
| 2008/0229867 | A1 | 9/2008 | Waibel | |
| 2008/0252056 | A1* | 10/2008 | Moriyama | B62D 1/184 |
| | | | | 280/775 |
| 2009/0013817 | A1 | 1/2009 | Schnitzer | |
| 2013/0298719 | A1 | 11/2013 | Schnitzer | |
| 2014/0000405 | A1 | 1/2014 | Anspaugh | |
| 2015/0203145 | A1* | 7/2015 | Sugiura | B62D 1/184 |
| | | | | 74/493 |
| 2016/0144885 | A1* | 5/2016 | Tanaka | B62D 1/187 |
| | | | | 74/493 |
| 2017/0008549 | A1 | 1/2017 | Tomiyama | |
| 2018/0354546 | A1 | 12/2018 | Kreutz et al. | |

FOREIGN PATENT DOCUMENTS

| | | | |
|---|---|---|---|
| DE | 10 2007 003 091 B | 8/2008 | |
| DE | 10 2011 000 319 B | 5/2012 | |
| DE | 10 2014 110 204 B | 10/2015 | |
| DE | 10 2018 201 029 A | 7/2018 | |
| DE | 10 2018 201 196 A | 7/2018 | |

\* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2020/050634, filed Jan. 13, 2020, which claims priority to German Patent Application No. DE 10 2019 200 488.1, filed Jan. 16, 2019, the entire contents of both of which are incorporated herein by reference.

FIELD

The present disclosure generally relates to steering columns, including steering columns for motor vehicles.

BACKGROUND

For adaptation of the steering wheel position to the seating position of the driver of a motor vehicle, adjustable steering columns are known. A vertical adjustment of the steering wheel attached to the rear end of the steering spindle can be undertaken by adjustment of the inclination of the steering column; in order to adjust the distance, a telescopic longitudinal adjustment can take place relative to the vehicle body in the direction of the steering column longitudinal axis.

The supporting unit of the steering column, also referred to as a bracket, is fixedly attached to the vehicle body. The steering spindle is mounted rotatably about its longitudinal axis in a casing tube in the adjusting unit. The adjustability is realized by means of a clamping device which can be brought either into a fixing position or a release position, for example by manual or motorized actuation of a clamping element to clamp or release same. In the fixing position, the adjusting unit is braced releasably in a force-fitting and/or form-fitting manner to the supporting unit in the operating position set. For adjustment purposes, the clamping device is brought into a release position, wherein the bracing is released and the steering column can be moved relative to the supporting unit and a desired operating position can be set.

In the form according to the type in question, the clamping device comprises a clamping mechanism which has a stroke-generating mechanism, in which a clamping bolt which is rotatable about a clamping axis serves as a clamping element. The clamping mechanism can be designed in a manner known per se as a V-pulley mechanism, a cam mechanism or a tilting pin mechanism which converts a rotation of the clamping bolt into a clamping stroke. The clamping stroke is exerted transversely with respect to the longitudinal axis in the direction of the clamping axis such that the adjusting unit can be pressed longitudinally with the clamping force against the supporting unit for fixing purposes. For example, it is known from DE 10 2011 000 319 B3 to press together two side members of the supporting unit, which extend in the vertical and longitudinal directions, by means of the clamping device such that the adjusting unit arranged in between is securely clamped between the side members.

In order to realize the vertical adjustment, the supporting unit has an elongated hole which extends in a slot-shaped manner in the vertical adjustment direction. The clamping bolt is mounted rotatably on the adjusting unit and is guided through the elongated hole. In the release position, the adjusting unit can be moved up or down in the vertical direction in its adjustment direction together with the clamping bolt and clamping mechanism relative to the supporting unit, with the clamping bolt being moved along in the elongated hole.

In order to effectively prevent the steering column from rising up in the event of a crash, it is known to fix the adjusting unit in the vertical direction in a particularly durable manner by means of a fixing element which is substantially disk-shaped and has an opening through which the clamping bolt passes. The fixing element is arranged between the clamping mechanism and the supporting unit so as to be effective in the direction of the clamping axis, and is moved together with the clamping bolt during the vertical adjustment. When brought into the fixing position, the fixing element is pressed against the supporting unit by the clamping device. In order to produce a particularly durable connection, mutually corresponding connecting means can be formed preferably on the fixing element and the supporting unit, for example force-fitting elements, preferably also form-fitting elements in the form of toothings which intermesh in the fixing position. In the release position, said connecting means are released from one another.

In order to ensure that the fixing element and the supporting unit are in a predetermined position with respect to each other, preferably the connecting means are in the optimum engagement position with respect to one another during the fixing operation, DE 10 2011 000 319 B3 describes a guide device in the form of a rotation lock in order to hold the fixing element relative to the supporting element in a defined rotational orientation with respect to the clamping axis, i.e. to prevent rotation at the same time as the clamping bolt during the release or clamping operation. The guide device has mutually corresponding guide elements on the fixing element and on the supporting unit, in which, in the release position of the clamping device, the fixing element is guided in a translational manner along the adjustment direction relative to the supporting unit. A projection is formed as the guide element on the fixing element, said projection engaging in the elongated hole, which forms the corresponding guide element on the supporting unit. The projection can be moved along in the elongated hole together with the clamping bolt. In order to realize an effective rotation lock, at least one guide element has to be arranged in the elongated hole at a distance from the clamping axis. As a result, the elongated hole has to be additionally extended beyond the required adjustment path of the vertical adjustment in order to be able to receive the guide element. A disadvantage of this is that an increase in size of the elongated hole requires additional construction space which is frequently not available.

Thus, a need exists for a steering column having a compactly constructed guide device which is optimized in terms of construction space.

DETAILED DESCRIPTION

Figure 1:
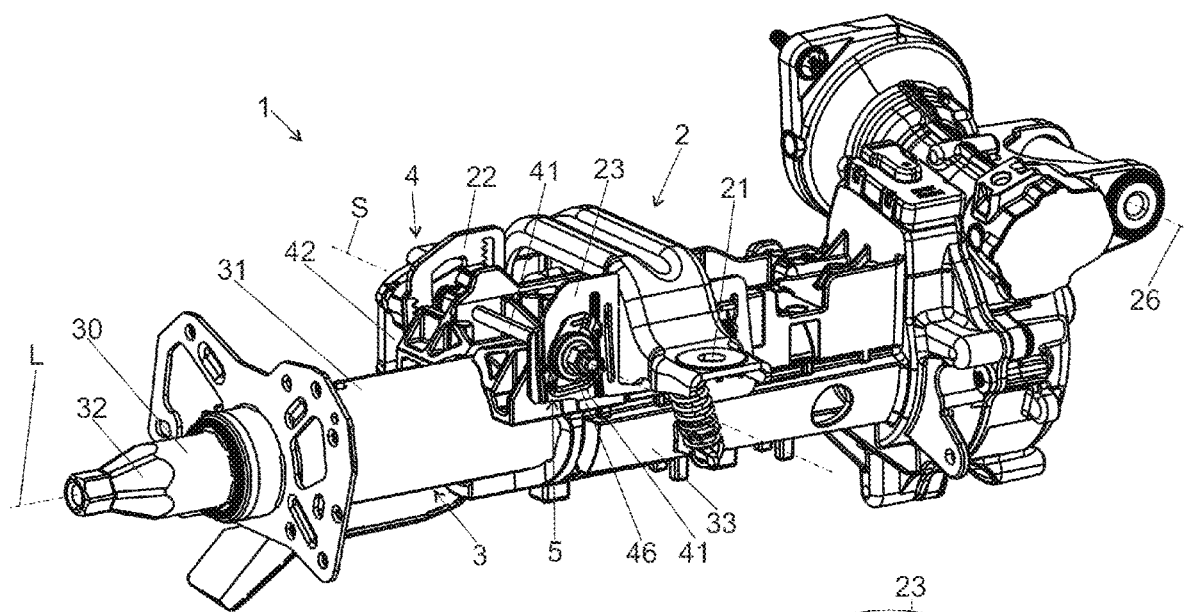
FIG. 1 is a perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In some examples, a steering column may include a supporting unit which is connectable to the body of a motor vehicle, an adjusting unit which is fixedly clampable releasably to the supporting unit and in which a steering spindle is mounted rotatably about its longitudinal axis, and a clamping device which can be brought into a fixing position, in which it locks the adjusting unit relative to the supporting unit, and into a release position, in which it releases an adjustment of the adjusting unit relative to the supporting unit at least in a vertical direction transversely with respect to the longitudinal axis, and which has a clamping bolt which is arranged along a clamping axis and is guided transversely with respect to the longitudinal axis through an elongated hole in the supporting unit, said elongated hole extending in an adjustment direction and in which said clamping bolt in the release position is movable in the adjustment direction, and which interacts with a clamping mechanism, wherein on the clamping bolt there is arranged a fixing element, which can be braced by the clamping device in the direction of the clamping axis against the supporting unit, and there is formed a guide device, with corresponding guide elements on the fixing element and on the supporting unit, in which guide elements the fixing element is guided in a translational manner relative to the supporting unit.

In the case of a steering column for a motor vehicle, comprising a supporting unit which is connectable to the body of a motor vehicle, an adjusting unit which is fixedly clampable releasably to the supporting unit and in which a steering spindle is mounted rotatably about its longitudinal axis, and a clamping device which can be brought into a fixing position, in which it locks the adjusting unit relative to the supporting unit, and into a release position, in which it releases an adjustment of the adjusting unit relative to the supporting unit at least in a vertical direction transversely with respect to the longitudinal axis, and which has a clamping bolt which is arranged along a clamping axis and is guided transversely with respect to the longitudinal axis through an elongated hole in the supporting unit, said elongated hole extending in an adjustment direction and in which said clamping bolt in the release position is movable in the adjustment direction, and which interacts with a clamping mechanism, wherein on the clamping bolt there is arranged a fixing element, which can be braced by the clamping device in the direction of the clamping axis against the supporting unit, and there is formed a guide device, with corresponding guide elements on the fixing element and on the supporting unit, in which guide elements the fixing element is guided in a translational manner relative to the supporting unit, it is provided according to the invention that the guide elements are arranged at a distance from the elongated hole.

According to the invention, the guide elements are realized outside the elongated hole. Accordingly, the dimensioning of the elongated hole is determined solely by the adjustment path and the diameter of the clamping bolt. As a result, the elongated hole can be shorter for the same adjustment path than in the prior art, in which additional guide means are arranged in the elongated hole. It is advantageous that the supporting torque that is crucial for the rotational fixing with respect to the clamping axis can be increased simply by the radial distance of the guide elements from the clamping axis, or from one another, being increased, with an extension of the elongated hole advantageously not being required in contrast to the prior art.

The radial distance of the guide elements from the elongated hole is preferably greater than 0 mm, particularly preferably greater than or equal to 0.2 mm, and particularly preferably greater than or equal to 2 mm.

In order to ensure a design saving on construction space, the distance is preferably less than 50 mm.

In the release position, the adjusting unit is preferably pivotable about a pivot axis relative to the supporting unit in order to provide the vertical adjustment.

Preferably, a connecting means which is formed on the fixing element is connectable in a fixing position to the supporting unit in order to form a connection which is effective in the adjustment direction. The fixing of the adjusting unit in the supporting unit can thereby be improved further, for example by means of force-fitting and/or form-fitting elements of the connecting means.

In the release position of the clamping device, the fixing element is inevitably guided in a translational manner relative to the supporting unit along the adjustment direction by means of the guide elements such that a rotation about the clamping axis relative to the supporting unit is prevented or is at least greatly limited. As a result, it can be ensured in particular that connecting means formed on the fixing element and the supporting unit, in particular form-fitting elements, such as toothings or the like, cannot be rotated in an uncontrolled manner in relation to one another about the clamping axis, and thus can always be optimally connected to one another during the fixing of the clamping device.

The connecting means preferably comprise mutually corresponding form-fitting elements on the fixing element and the supporting unit. The form-fitting elements can comprise, for example, toothings which can be formed on the oppositely directed sides, which are opposite one another in the direction of the clamping axis and are substantially perpendicular to the clamping axis, or, alternatively or additionally, on edge surfaces of the fixing element, said edge surfaces lying at least partially substantially parallel to the clamping axis. The toothings preferably have teeth which run transversely with respect to the vertical direction, and therefore, during the engagement, a form-fitting connection which is effective in the vertical direction, i.e. the vertical adjustment direction, which is predetermined by the elongated hole, is produced. The form-fitting elements are securely connected to one another in every case when the clamping axis is actuated and the fixing element with the supporting unit, and the supporting unit with the adjusting unit, are moved toward one another, and connected to one another, by the clamping stroke of the clamping mechanism.

Alternatively or additionally, the connecting means can comprise force-fitting elements. Force-fitting elements have at least one frictional surface.

The guide elements can preferably be arranged along at least one longitudinal edge of the elongated hole outside the opening cross section, for example parallel to the longitudinal extent of the elongated hole. It can be advantageous in respect of a secure rotational fixing with respect to the supporting unit that guide elements are arranged on both longitudinal sides of the elongated hole.

The guide elements can run parallel at the longitudinal edges of the elongated hole. It is possible here for the guide elements to be at a distance from the longitudinal edges transversely with respect to the longitudinal extent of the elongated hole. An increased distance from the longitudinal edge also increases the distance of the guide elements from the clamping axis, and therefore an increased supporting torque for a durable rotational fixing can be produced.

Guide elements can preferably be arranged on both sides of the elongated hole. A high supporting torque of the rotation lock can thereby be realized with little outlay and with a compact design.

The guide device formed by the guide elements guides the fixing element in a manner preferably following the profile of the elongated hole. If the elongated hole, for example, is curved, the guide elements can preferably likewise extend in a curved manner parallel thereto.

The elongated hole and the at least one guide element can be curved. Particularly preferably, the curved design of the elongated hole and of the at least one guide element is defined by a radius, wherein the center point of the radius coincides with the pivot axis.

An advantageous embodiment of the invention makes provision for mutually corresponding guide elements to be arranged on the end sides of the fixing element and the supporting element, said end sides being opposite one another in the direction of the clamping axis. For functional reasons, the end sides have an extent in the longitudinal and vertical directions, with the end sides extending in a manner overlapping at least in sections in the region of the longitudinal edges of the elongated hole. As a result, in addition, a translational guide according to the invention can be formed within the surface of the fixing element parallel to the longitudinal and vertical directions. In particular, no guide means located outside the surface extent of the fixing element in the longitudinal and vertical directions are required on the supporting element, which is advantageous for a compact design.

It is possible for the guide elements to comprise at least one rail and a sliding piece which is movable along the latter. A rail is understood as meaning an elongate profile which has at least one web or projection, or a groove or opening, extending longitudinally in the adjustment direction. A rail is arranged on one or preferably on both sides of the elongated hole in the direction of the longitudinal extent thereof, preferably parallel to the longitudinal edge. The sliding piece has a free cross section corresponding to the rail, for example a groove or a projection, which can be brought into engagement with the rail in such a manner that the sliding piece can be moved in a manner guided along the longitudinal direction of the rail. The sliding piece here is preferably shorter in the longitudinal direction than the rail. The rail and the sliding piece preferably form a form-fitting connection transversely with respect to the longitudinal direction. Such rails and sliding pieces can be adapted in a structurally simple manner to the loadings anticipated during operation and to the available construction space, and can be realized with little manufacturing outlay.

The rail can preferably be curved, wherein preferably the center point of the radius coincides with the pivot axis.

Preferably, at least one rail can be formed on the supporting unit, and at least one sliding piece on the fixing element, or vice versa. It is also possible to in each case arrange at least one sliding piece and at least one rail in each case on the supporting unit and the fixing element.

Differently designed pairs of rail and sliding piece can also be provided such that, during the assembly, rails and sliding pieces determined exclusively for one another can be put together. As a result, an erroneous orientation during the installation is prevented and the assembly is simplified.

It can be provided that one guide element is formed integrally with the fixing element and/or the supporting element. The integration of the guide elements, which can be designed, for example, as molded-in grooves or molded-on webs, means that no additional components arise, which simplifies the manufacturing and increases the functional reliability. By means of relevant manufacturing processes, guide elements can be molded integrally onto the fixing element and onto the supporting element, at least in the region of the elongated hole, virtually without a noticeable additional outlay, for example by means of forming operations, such as bending, punching, pressing and the like, or by means of shaping manufacturing by means of injection molding, sintering or the like.

In this connection, the manufacturing of the fixing element and of the supporting unit as sheet-metal molded parts by means of pressing, punching, bending, deep drawing and the like, preferably from steel sheet, is particularly advantageous.

However, it can also be provided that the supporting unit is designed as a cast component, preferably consisting of an aluminum alloy or a magnesium alloy.

An advantageous embodiment is that one guide element is mounted resiliently on the fixing element and/or the supporting unit. By means of a spring element which is arranged between a guide element and the fixing element or the supporting unit, the guide element is supported here in a spring-elastic manner in the direction of the clamping axis. This has the advantage that the guide elements can be continuously kept in guide engagement by means of spring force both in the release position and in the fixing position such that the sought rotation lock is ensured in every operating state. The deflection of the guide element between the fixing position and the release position is preferably greater than 1 mm, particularly preferably greater than 4 mm. In order to realize a compact design, this deflection is preferably smaller than 10 mm. A further advantage results from the fact that, during the fixing, the guide elements are moved toward one another counter to the spring force, with the spring element which exerts the spring force being tensioned. By means of the spring tensioning which is built up during the fixing, when the clamping device is released, the fixing element is pushed away from the supporting unit, with the connecting means automatically being separated from one another. For example, toothings forming the form-fitting element are raised from one another in the direction of the clamping axis and are disengaged. A secure and simple adjustment of the steering column is thereby ensured. By means of the resilient mounting, the guide elements thus obtain an advantageous dual function as rotation lock and for release assistance.

The guide elements, the spring elements and the connecting means are preferably designed as a single-piece integral component in order to form the fixing element.

The spring element is preferably designed as a leaf spring. Alternatively or additionally, this can also have different geometrical forms, for example a spiral spring element or a disk spring element.

It can preferably be provided that the fixing element has at least one laterally protruding cantilever to or on which at least one guide element is attached or arranged. The at least one cantilever can be designed as an arm or carrier which protrudes outward on the fixing element, as seen from the clamping axis. The length of the effective torque support can be predetermined by the dimensioning of the cantilever, and there is increased structural freedom for the positioning of the corresponding guide elements on the supporting unit.

It can preferably be provided that the at least one guide element is attached to or arranged on the free end of the cantilever.

An advantageous development makes provision for at least one cantilever to have a spring element. The guide element can be supported here on a cantilever via the spring element. It is particularly advantageous that the cantilever itself is designed at least over part of its length in a flexurally elastic manner as a spring tongue. The cantilever protrudes laterally from the fixing element transversely with respect to the clamping axis, for example at least partially transversely with respect to the adjustment direction. The guide element is attached to the free end region of the cantilever, the end region facing away from the fixing element, and is held, and supported resiliently, on the fixing element counter to the direction of the clamping axis by means of the flexurally elastic cantilever. The cantilever here is formed and dimensioned in such a manner that it keeps the corresponding guide elements in guide engagement under spring tension both in the fixing position and in the release position.

One or more such cantilevers can simply be designed as spring tongues or leaf springs in which the spring element is integrated in the cantilever, preferably integrally. It is particularly advantageous that one or more, preferably all of the cantilevers, are formed integrally with the fixing element. For example, the fixing element can be manufactured as an integral sheet-metal molded part including the cantilevers, preferably from steel or spring steel sheet. The spring characteristics of the cantilevers can then be predetermined, and optimized in respect of the functional specifications, with little outlay by means of the length, the shape, the material and the cross section of the cantilevers.

Owing to the fact that the fixing element and/or the supporting element at least partially comprise/comprises a sheet-metal molded part, the guide elements and/or spring elements and/or connecting means can be realized with little outlay in terms of manufacturing. An integral design as a sheet-metal molded part, preferably from steel or spring steel sheet, is particularly advantageous and economical.

Guide elements can be formed on an integral fixing element by forming operations, for example by means of bead-shaped moldings or formations, and connecting means, for example, as punched or pressed-in toothings, and cantilevers as resilient, strip-shaped arms, on which guide elements are molded.

An advantageous embodiment makes provision for the fixing element to have three guide elements, of which two are arranged at a distance from each other on the one side of the elongated hole, and one is arranged on the other side of the elongated hole, between the two other guide elements. By means of the precisely three guide elements which are arranged in a triangle and are preferably attached in each case to the end of a resilient cantilever, a stable three-point mounting is formed. It is thereby ensured that, even in the release position, none of the guide elements protrudes freely, as a result of which vibrations and an undesirable production of noise are substantially prevented.

Figure 4:
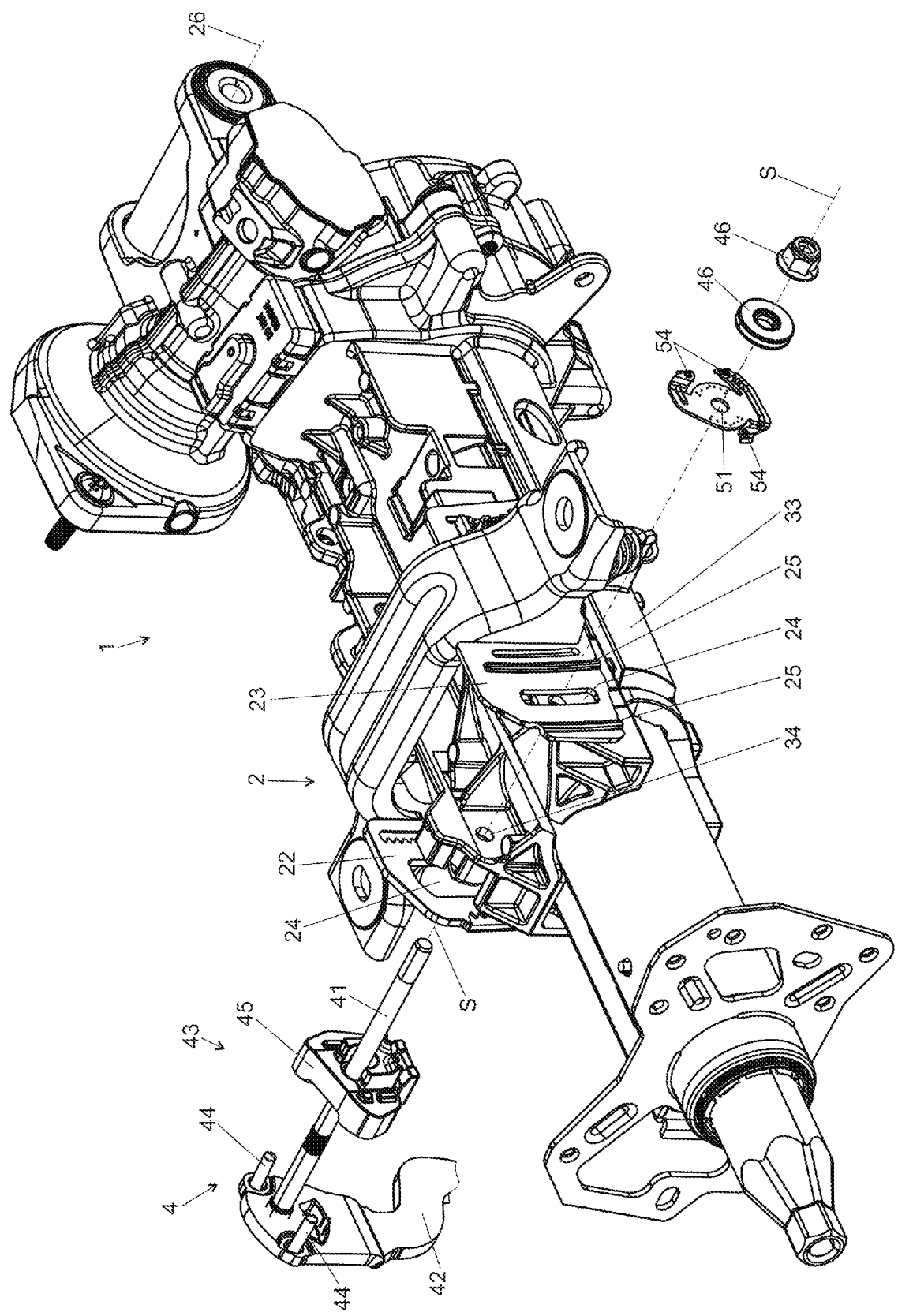
FIG. 4 is a partially exploded view of the steering column according to FIG. 1.

FIG. 1 illustrates a steering column 1 according to the invention schematically in a perspective view obliquely from the rear (with respect to the direction of travel of a motor vehicle, not shown). FIG. 4 shows the steering column 1 in a partially exploded illustration of the clamping device.

The steering column 1 can be fastened to the body of a motor vehicle, not illustrated, by means of a supporting unit 2, which is also referred to as a bracket. The supporting unit 2 comprises fastening means 21 for the connection to the body. From the supporting unit 2, side members 22, 23 extend downward and are opposite each other with respect to a longitudinal axis L. In the front region, the casing unit 34 is mounted on the body so as to be pivotable about a pivot axis 26 lying horizontally transversely with respect to the longitudinal axis L, and therefore the adjusting unit 3 is adjustable up and down in the vertical direction H for the vertical adjustment, as is indicated by the double arrow. In other words, the adjusting unit 3 is pivotable about the pivot axis 26 in relation to the supporting unit 2.

An adjusting unit 3 comprises a steering spindle 30 which is mounted in an inner casing tube 31, referred to for short as casing tube 31, so as to be rotatable about the longitudinal axis L. A steering wheel, not illustrated, can be attached to the steering spindle 30 at a fastening portion 32 at the rear end. At a rear end, the steering spindle 30 is connectable to a steering shaft, wherein the latter can comprise at least one universal joint and is connectable in a torque-locking manner to a steering mechanism, not shown. The casing tube 31 is secured in a receptacle of an outer casing unit 33, casing unit 33 for short, the receptable being continuous in the longitudinal direction.

A clamping device 4 has a clamping bolt 41 which extends on a clamping axis S transversely with respect to the longitudinal axis L. The clamping bolt 41 is guided through elongated holes 24 in the side members 22, 23. The clamping bolt 41 is mounted on the casing unit in bearings 34 so as to be rotatable about the clamping axis S, with said bearings 34 being formed by bores.

An actuating lever 42 is attached to the clamping bolt 41 for rotation therewith. In the example shown, a clamping mechanism 43 is designed as a tilting pin mechanism, which is known per se, with tilting pins 44 supported on the actuating lever and with a pressure piece 45 which interacts with said tilting pins and is supported from the outside against the one side member 22. The other end of the clamping bolt 41 facing the actuating lever 42 is supported from the outside against the other side member 23 via an abutment 46. A fixing element 5 according to the invention, which will be explained in more detail, is arranged between the abutment 46 and the outer side of the side member 23. The abutment is formed by an axial bearing comprising at least one rolling body, for example a ball or a cylinder pin, and a nut, for example a self-securing nut with a hexagon stub.

If, by means of the actuating lever 42, the clamping bolt 41 is rotated about the clamping axis S in order to set the fixing position in the locking or clamping direction, the clamping mechanism 43 produces a clamping stroke in the direction of the clamping axis S between the side member 22 and the actuating lever 42. As a result, the clamping bolt 41 pulls the abutment 46 from the outside against the side member 23 with the clamping force produced by the clamping mechanism 43, and the pressure piece 45 is supported from the outside against the side member 22 with the same clamping force such that the adjusting unit 3 is securely clamped, i.e. releasably braced, between the side members 22 and 23.

If the clamping device 4 is brought into the release position by an opposite rotation of the clamping bolt 41, the clamping bolt 41 can be moved by the pressure piece 45 in the direction of the clamping axis S axially toward the abutment 46 such that the clamping force which is exerted from the outside on the side members 22, 23 is neutralized and the clamping of the adjusting unit 3 is released. In this relaxed release position, the adjusting unit 3 can be adjusted up and down in the vertical direction H relative to the supporting unit 2. The clamping bolt 41 is moved here upward or downward in the adjustment direction in each case along the longitudinal extent of the elongated hole 24.

Figure 2:
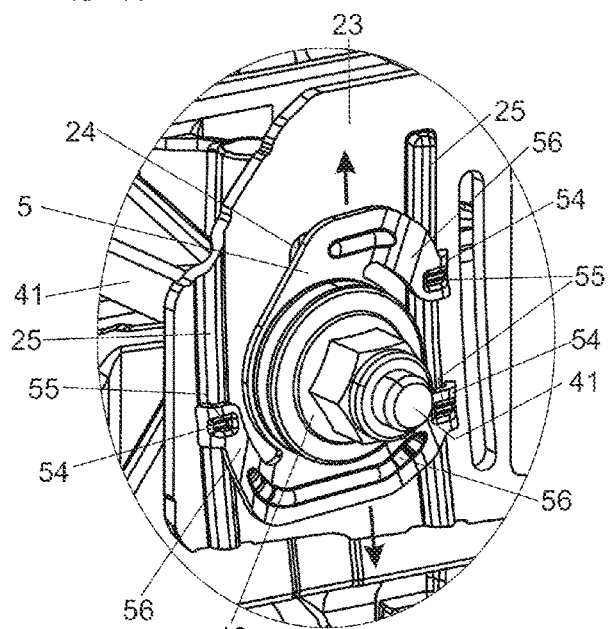
FIG. 2 is a detail view of an example guide device of the steering column according to FIG. 1.
Figure 3:
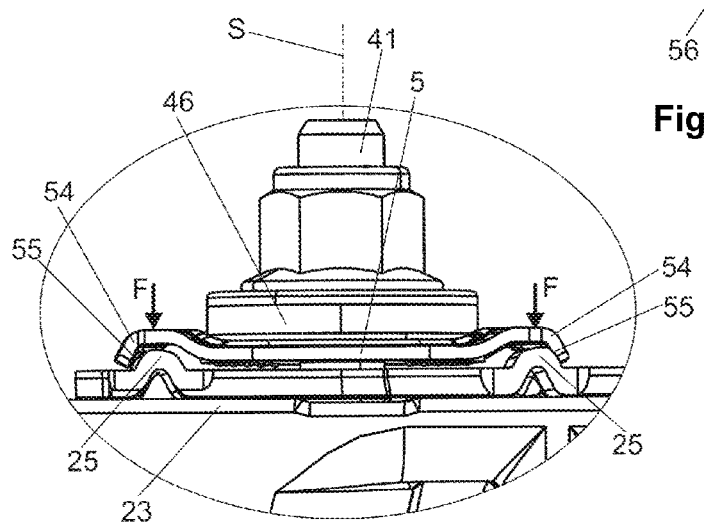
FIG. 3 is a side view of the guide device according to FIG. 2 in an adjustment direction.
Figure 5:
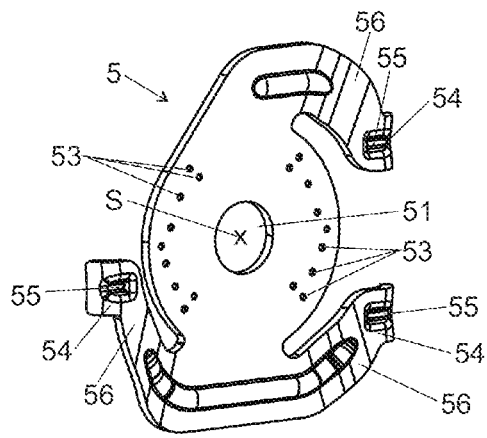
FIG. 5 is a perspective view of the outer side of an example fixing element that faces away from the supporting unit.
Figure 6:
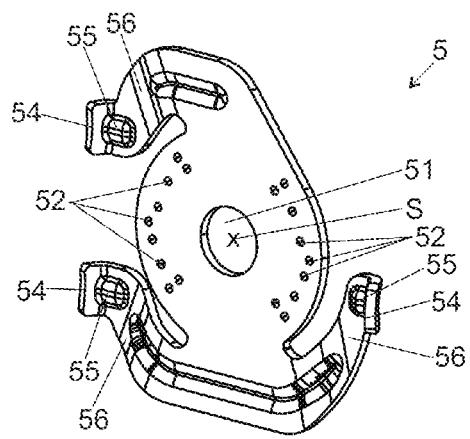
FIG. 6 is a perspective view of the inner side of an example fixing element that faces the supporting unit.

The fixing element 5 is attached to the clamping bolt 41 between the abutment 46 and the outer side of the side member 23, as illustrated perspectively in FIG. 2 as an enlargement of the detail from FIG. 1, and in the partial top view of FIG. 3 looking from above perpendicularly to the longitudinal axis L and perpendicularly to the clamping axis S. FIG. 5 shows the fixing element 5 exposed in the perspective of FIG. 2, i.e. onto the outer side facing away from the supporting unit 3. FIG. 6 shows a view of the inner side of the fixing element 5, the inner side facing the supporting unit 3.

The fixing element 5 has the basic shape of a flat disk, with a central opening 51 through which, in the mounted state as in FIGS. 2 and 3, the clamping bolt 41 passes in the direction of the clamping axis S.

Connecting means 52 which are designed in the embodiment of FIG. 6 as protruding studs are arranged on the inner side, which faces the outer side of the side member 23 of the supporting unit 2. Said studs are formed by moldings which, as can be seen in FIG. 5, are molded plastically from the outside into the fixing element 5, which is preferably formed from steel sheet or spring steel sheet, preferably by being pressed in. During the fixing, the end side, which is visible in FIG. 6, is pressed from the outside in the direction of the clamping axis S against the side member 23, with the stud-shaped connecting means 52 being pressed locally into the surface and producing a force-fitting and form-fitting connection which is effective in the adjustment direction, i.e. in the direction of the longitudinal extent of the elongated hole 24.

The fixing element 5 has a total of three guide elements 54 which each have a groove 55 which is molded in toward the supporting unit 2 and extends in the adjustment direction. Each of the guide elements 54 is in each case arranged at the free end region of a strip-shaped cantilever 56 protruding from the fixing element 5. A cantilever 56 is formed here in each case by means of a flexurally elastic arm composed of steel or spring steel sheet, which is preferably formed integrally with the fixing element 5. The groove 55 is likewise in each case molded integrally into the cantilever 56 by pressing or bending forming.

The strip-shaped configuration means that a cantilever 56 in each case forms a flexurally elastic leaf spring or spring tongue which in each case forms a holder, which is resilient in the direction of the clamping axis S, of a guide element 54.

Two rails 25 which protrude in a web-shaped manner and form guide elements corresponding to the grooves 55 are arranged on the outside of the side member 23 in a manner running parallel to the elongated hole 24. As can be gathered from FIGS. 2 and 3, the guide elements 54 sit with the grooves 55 on the rails 25, and form sliding pieces which are displaceable in a sliding manner on the rail 25. In the view of FIGS. 2 and 5, one guide element 54 is arranged on the rail 25 which is located on the left in the view, and two guide elements 54 are arranged on the rail 25 which is located on the right in the view, and therefore they are located at the corners of a triangle.

In the release position of the clamping device 4, the guide elements 54 can slide along on the rails 25 when the clamping bolt 41 is moved upward or downward along the elongated hole 24 during the vertical adjustment, as indicated by the arrows in FIG. 2. As a result, the fixing element 5 is inevitably guided in a translational manner in the direction of the rails 25 parallel to the elongated hole 24 and cannot rotate with respect to the clamping axis S when the clamping bolt 41 is rotated for the fixing or release. Owing to the fact that the cantilevers 56 press the guide elements 54 resiliently against the rails 25 with a spring force F, as shown in FIG. 3, a rotation lock is ensured in every operating state. The grooves 55 are not only located in a form-fitting manner on the rails 25 in the fixing position, illustrated in FIG. 3, but also in the release position when the adjustment can take place. In the release position, the fixing element 5 is pushed away from the outer side of the side member 23 by the spring force F such that the connection of the connecting means 52 to the side member 23 is released, and the clamping bolt 41 together with the fixing element 5 can be moved up or down for the vertical adjustment of the adjusting unit 3 relative to the supporting unit 2.

In the embodiment illustrated, the three guide elements 54 are arranged at the corners of a triangle, wherein two guide elements 54 are arranged in a sliding manner on the rail 25 on the longitudinal edge located on the right of the elongated hole 24 in FIG. 2, and the third guide element 54 is arranged on the rail 25 which is located on the opposite side with respect to the elongated hole. A stable three-point mounting of the fixing element 5 is thereby produced.

Figure 7:
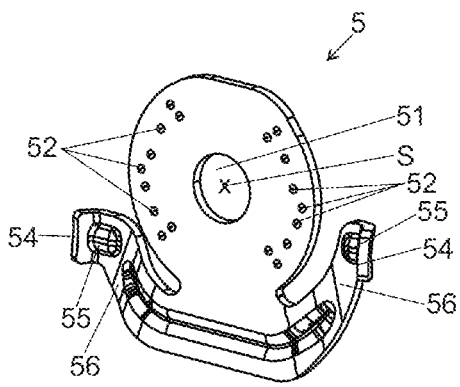
FIG. 7 is a perspective view of the outer side of another example fixing element that faces away from the supporting unit.

FIG. 7 shows a second embodiment of a fixing element 5 which is in principle constructed identically to the embodiment according to FIG. 6, but has only two cantilevers 56.

Figure 8:
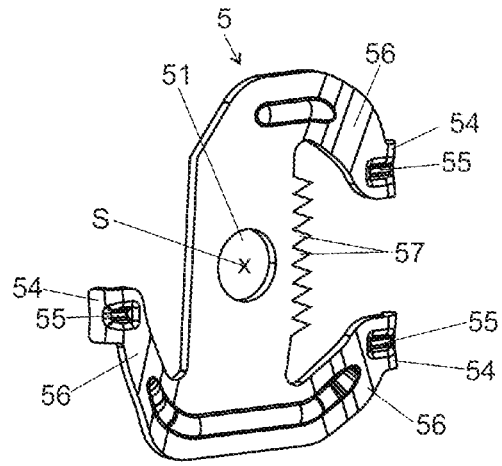
FIG. 8 is a perspective view of still another example fixing element, showing an outer side that faces away from the supporting unit.

The third embodiment of a fixing element 5 that is illustrated in FIG. 8 has three cantilevers 56 like the embodiment according to FIG. 6. A toothing 57 which has a row of teeth extending in the direction of the elongated hole 24 is formed on the edge of the fixing element 5. The toothing 57 forms a form-fitting element which can be brought during the fixing into engagement with a corresponding form-fitting element (not illustrated), in the form of a mating toothing, on the outside of the side member 23 in order to produce a form-fitting connection which is effective in the adjustment direction.

Figure 9:
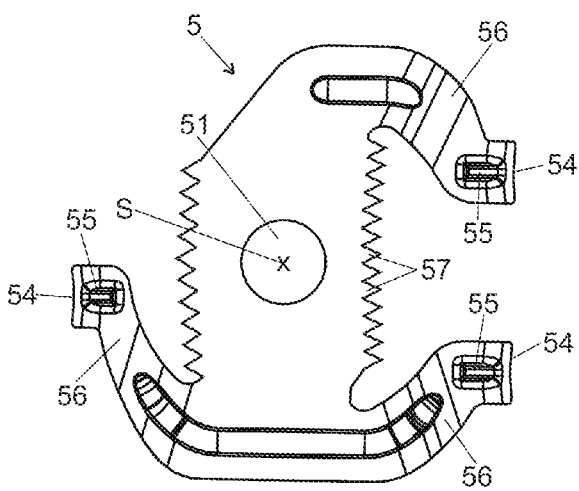
FIG. 9 is a top view of yet another example fixing element.

The fourth embodiment illustrated in FIG. 9 is designed similarly to the fixing element 5 according to FIG. 8. In addition, a second toothing 57 is provided here on the opposite side of the elongated hole 24 with respect to the clamping axis S. The two toothings 57 which are opposite each other with respect to the elongated hole 24 engage in a form-fitting manner in corresponding mating toothings (not illustrated) on the outer side of the side member 23 in the fixing position. The mating toothings have rows of teeth running substantially parallel to the elongated hole 24 and the rails 25. By means of the guide device formed according to the invention by the guide elements 54 together with the rails 25, the fixing element 5 maintains its rotational orientation with respect to the clamping axis S during the adjustment, and therefore the toothings 57 are always optimally aligned relative to the mating toothings and can be brought into engagement by means of a movement in the direction of the clamping axis S. The toothing on the one side of the elongated hole 24, here the left toothing 57 in FIG. 9, has teeth with a tooth tip angle which is greater than the tooth tip angle of the teeth of the toothing on the other side of the elongated hole 24, the right toothing 57 in FIG. 9. In a mounted state of the steering column 1, the toothing 57 with the teeth with the smaller tooth tip angle i is closer to the pivot axis 26 than the toothing 57 with the teeth with the larger tooth tip angle. The tooth tip angle is the angle of the tooth flanks of a tooth.

In the fixing position, the toothings 57 are in form-fitting engagement and secure the fixing element 5 with the clamping bolt 41, and therefore also the adjusting unit 3, against a movement in the vertical direction, as a result of which the steering column 1 is effectively prevented from rising up in the event of a crash. When the clamping device 4 is released, the fixing element 5 is lifted off outward from the side member 23 by the spring force F exerted by the elastic cantilevers 56, as a result of which the toothings 57 are brought out of the form-fitting engagement and the adjusting element 3 can be adjusted in the vertical direction.

Figure 10:
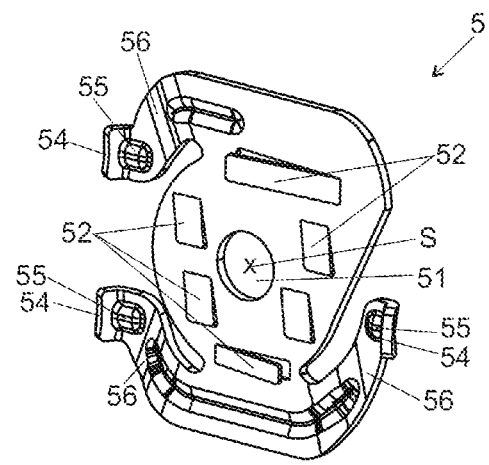
FIG. 10 is a perspective view of another example fixing element.

FIG. 10 shows a fifth embodiment which is designed similarly to the fixing element 5 according to FIG. 6. The connecting means 52 here have tabs or tongues which protrude in the manner of scales and, during the fixing, produce a force-fitting and/or form-fitting connection similarly to the studs in the first embodiment.

The fixing element 5 according to FIGS. 5 to 10 can preferably be designed as an integral sheet-metal molded part, preferably from steel or spring steel sheet, which can be manufactured economically by forming by means of punching, bending and/or pressing.

A longitudinal adjustment in the direction of the longitudinal axis L can be realized in that, in the release position, the inner casing tube 31 is displaceable telescopically within the outer casing unit 33 in the direction of the longitudinal axis L. In the fixing position, the casing tube 31 is fixed in the casing unit 33 in the longitudinal direction by means of the side members 22 and 23 which are then braced against each other. The bracing ensures that, with the forces customarily acting on the steering spindle 30 via the steering wheel during normal operation, the set steering wheel position is not changed in the longitudinal and vertical directions.

Furthermore, a steering column 1 according to the invention can preferably comprise an energy absorption device, wherein an energy absorption element is arranged in such a manner that it is deformed in the event of an accident-induced head-on impact. Such energy absorption devices are well known to a person skilled in the art from the prior art.

LIST OF DESIGNATIONS

1 Steering column
2 Supporting unit (bracket)
21 Fastening means
22, 23 Side members
24 Elongated hole
25 Rails
26 Pivot axis
3 Adjusting unit
30 Steering spindle
31 (Inner) casing tube
32 Fastening portion
33 (Outer) casing unit
34 Bearing
4 Clamping device
41 Clamping bolt
42 Actuating lever
43 Clamping mechanism
44 Tilting pin
45 Pressure piece
5 Fixing element
51 Opening
52 Connecting means
53 Moldings
54 Guide elements
55 Groove
56 Cantilever
57 Toothing
L Longitudinal axis
S Clamping axis
F Spring force

What is claimed is:
1. A steering column for a motor vehicle comprising:
a supporting unit that is connectable to a body of the motor vehicle;
an adjusting unit that is fixedly clampable in a releasable manner to the supporting unit, wherein a steering spindle is rotatably mounted about a longitudinal axis in the adjusting unit;
a clamping device configurable in a fixing position where the clamping device locks the adjusting unit relative to the supporting unit and configurable in a release position where the clamping device releases the adjusting unit for adjustment relative to the supporting unit at least in a vertical direction transversely with respect to the longitudinal axis, wherein the clamping device includes a clamping bolt that is disposed along a clamping axis and is guided transversely relative to the longitudinal axis through an elongated hole in the supporting unit, with the elongated hole extending in an adjustment direction, wherein in the release position the clamping bolt is movable in the elongated hole in the adjustment direction, wherein the clamping device interacts with a clamping mechanism;
a fixing element that is disposed on the clamping bolt and is configured to be braced by the clamping device in a direction of the clamping axis against the supporting unit;
a guide device, including corresponding guide elements on the fixing element and on the supporting unit, in which guide elements the fixing element is guided in a translational manner relative to the supporting unit, wherein the guide elements are spaced apart from the elongated hole, wherein the fixing element includes a laterally protruding cantilever to which at least one of the guide elements is attached, wherein the laterally protruding cantilever includes a spring element.

2. The steering column of claim 1 wherein the guide elements are disposed on both sides of the elongated hole.

3. The steering column of claim 1 comprising a connecting means that is formed on the fixing element and is connectable in a fixing position to the supporting unit to form a connection that is effective in the adjustment direction.

4. The steering column of claim 1 wherein the guide elements are disposed on end sides of the fixing element and the supporting unit, wherein the end sides are opposite one another in the direction of the clamping axis.

5. The steering column of claim 1 wherein the guide elements comprise a rail and a sliding piece that are movable relative to one another.

6. The steering column of claim 1 wherein one of the guide elements is integral with at least one of the fixing element or the supporting unit.

7. The steering column of claim 1 wherein one of the guide elements is mounted resiliently on at least one of the fixing element or the supporting unit.

8. The steering column of claim 1 wherein at least one of the fixing element or the supporting unit at least partially includes a sheet-metal molded part.

9. A steering column for a motor vehicle comprising:
a supporting unit that is connectable to a body of the motor vehicle;
an adjusting unit that is fixedly clampable in a releasable manner to the supporting unit, wherein a steering spindle is rotatably mounted about a longitudinal axis in the adjusting unit;
a clamping device configurable in a fixing position where the clamping device locks the adjusting unit relative to the supporting unit and configurable in a release position where the clamping device releases the adjusting unit for adjustment relative to the supporting unit at least in a vertical direction transversely with respect to the longitudinal axis, wherein the clamping device includes a clamping bolt that is disposed along a clamping axis and is guided transversely relative to the longitudinal axis through an elongated hole in the supporting unit, with the elongated hole extending in an adjustment direction, wherein in the release position the clamping bolt is movable in the elongated hole in the adjustment direction, wherein the clamping device interacts with a clamping mechanism;
a fixing element that is disposed on the clamping bolt and is configured to be braced by the clamping device in a direction of the clamping axis against the supporting unit;
a guide device, including corresponding guide elements on the fixing element and on the supporting unit, in which guide elements the fixing element is guided in a translational manner relative to the supporting unit, wherein the guide elements are spaced apart from the elongated hole,
wherein the fixing element includes three of the guide elements, two of which are spaced apart from one another on a first side of the elongated hole and one of which is disposed on a second side of the elongated hole between two others of the guide elements.

10. The steering column of claim 9 wherein the guide elements are disposed on both sides of the elongated hole.

11. The steering column of claim 9 comprising a connecting means that is formed on the fixing element and is connectable in a fixing position to the supporting unit to form a connection that is effective in the adjustment direction.

12. The steering column of claim 9 wherein the guide elements are disposed on end sides of the fixing element and the supporting unit, wherein the end sides are opposite one another in the direction of the clamping axis.

13. The steering column of claim 9 wherein the guide elements comprise a rail and a sliding piece that are movable relative to one another.

14. The steering column of claim 9 wherein one of the guide elements is integral with at least one of the fixing element or the supporting unit.

15. The steering column of claim 9 wherein one of the guide elements is mounted resiliently on at least one of the fixing element or the supporting unit.

16. The steering column of claim 9 wherein the fixing element includes a laterally protruding cantilever to which at least one of the guide elements is attached.

17. The steering column of claim 16 wherein the laterally protruding cantilever includes a spring element.

18. The steering column of claim 9 wherein at least one of the fixing element or the supporting unit at least partially includes a sheet-metal molded part.

19. A steering column for a motor vehicle comprising:
a supporting unit that is connectable to a body of the motor vehicle;
an adjusting unit that is fixedly clampable in a releasable manner to the supporting unit, wherein a steering spindle is rotatably mounted about a longitudinal axis in the adjusting unit;
a clamping device configurable in a fixing position where the clamping device locks the adjusting unit relative to the supporting unit and configurable in a release position where the clamping device releases the adjusting unit for adjustment relative to the supporting unit at least in a vertical direction transversely with respect to the longitudinal axis, wherein the clamping device includes a clamping bolt that is disposed along a clamping axis and is guided transversely relative to the longitudinal axis through an elongated hole in the supporting unit, with the elongated hole extending in an adjustment direction, wherein in the release position the clamping bolt is movable in the elongated hole in the adjustment direction, wherein the clamping device interacts with a clamping mechanism;
a fixing element that is disposed on the clamping bolt and is braced by the clamping device in a direction of the clamping axis against the supporting unit, wherein a side of the fixing element that is in direct contact with the supporting unit includes protruding studs that extend locally into a surface of the supporting unit and produce a force-fitting and form-fitting connection between the fixing element and the supporting unit;
a guide device, including corresponding guide elements on the fixing element and on the supporting unit, in which guide elements the fixing element is guided in a translational manner relative to the supporting unit, wherein the guide elements are spaced apart from the elongated hole.

20. The steering column of claim 19 wherein the fixing element is braced by the clamping device directly against the supporting unit, free of any intermediate component between the fixing element and the supporting unit, wherein the guide elements of the supporting unit are integral with a remainder of the supporting unit.

\* \* \* \* \*